United States Patent [19]

Herrouin et al.

[11] 4,396,082
[45] Aug. 2, 1983

[54] AIR CUSHION VEHICLES

[75] Inventors: Guy Herrouin; André Lafont, both of Paris, France

[73] Assignee: Societe d'Etudes et de Developpement des Aeroglisseurs Marins Terrestres & Amphibies (S.E.D.A.M.), Paris, France

[21] Appl. No.: 185,770

[22] Filed: Sep. 10, 1980

[30] Foreign Application Priority Data

Sep. 18, 1979 [FR] France ............................. 79 23213

[51] Int. Cl.³ .............................................. B60V 1/16
[52] U.S. Cl. .................................................. 180/127
[58] Field of Search ............... 180/116, 121, 122, 127, 180/128

[56] References Cited

U.S. PATENT DOCUMENTS 3,513,933  5/1970  Faure ................................. 180/127
4,237,992 12/1980  Bristow ............................. 180/127

Primary Examiner—John A. Pekar
Assistant Examiner—D. Lynn Fugate
Attorney, Agent, or Firm—Alan H. Levin

[57] ABSTRACT

An air cushion vehicle comprises a structure to be lifted, a central lifting cushion, and a peripheral lifting arrangement constituted by a plurality of cells defined externally by an outer multi-lobed skirt.

Each lobe of the outer skirt is constituted by an assembly of an upper part defined by a surface of revolution which diverges downwards with respect to the structure, and of a lower part defined by a surface of revolution which converges downwards with respect to the structure, so that the lobe projects outside the structure. The lifting surface of the cells and thus of the entire cushion is increased and they project externally of the structure thus protecting the structure against impact.

4 Claims, 3 Drawing Figures

FIG_1

AIR CUSHION VEHICLES

The present invention relates to vehicles or machines travelling on pressurized fluid cushions, so called ground effect machines. Hereafter, in order to simplify the explanation, we shall speak solely of vehicles travelling on air cushions, without this expression being in any way limiting.

More precisely, the present invention relates to vehicles travelling on air cushions of the type in which a structure is lifted by a plurality of air cushions defined by flexible skirts, thus defining a central cushion and a peripheral arrangement comprising a plurality of adjacent closed cells (or compartments).

More precisely, the present invention relates to vehicles travelling on air cushions of the type described in either of the two French Pat. Nos. 74 27 139 (U.S. Pat. No. 2,281,251) filed on Aug. 5th 1974 and 75 04960 (U.S. Pat. No. 2,301,422) filed on Feb. 18th 1975 and whereof the applicant is co-owner.

These two patents are cited in this instance as a reference, it being understood that reference may be made to the latter to obtain a full understanding of the present description.

In the two aforementioned patents, the peripheral arrangement is defined externally by an outer skirt constituted by a plurality of adjacent lobes. Thus, in Pat. No. 74 27139, the outer skirt is constituted by the juxtaposition of the lobes $L_{e1}$, $L_{e2}$, $L_{e3}$..., whereas in Pat. No. 75 04960 it comprises the juxtaposition of the lobes $L_1$, $L_2$, $L_3$... In both cases, the lobes are constituted by skirts suspended from the structure of the machine and having simple, generally cylindrical or frustoconical shapes. Hereafter, in order to simplify the explanation, it will be stated that these vehicles have an outer "multi-lobed" skirt.

The present invention relates essentially to a new construction of the outer multi-lobed skirt of vehicles comprising a central cushion and peripheral arrangement of the prior art.

According to the invention, each lobe of the skirt has a "bi-conical" or "bi-cylindrical" shape, the lobe being constituted by the combination of two identical parts of revolution connected by a connecting plane. The term "identical" parts of revolution is intended to mean either two cylinders having the same radius or two truncated cones of the same conicity. A first part of revolution is suspended from the platform, preferably its upper parts and its generatrices diverge obliquely downwards. On the underside, the generatrices of the second part of revolution, which is connected to the first, converge towards the centre of the platform.

Thus, overall, the lobe which is in two parts fitted together has a projecting shape quite different from the straight shapes of the prior art.

As will be seen more completely hereafter, the particular geometric conditions, which form part of the invention, are necessary for the equilibrium of a lobe of this type in two parts.

In any case, it will be understood that for equipping vehicles of the aforesaid type, the new outer skirt according to the invention has two important advantages: firstly and this is the main advantage, the projecting nature of the lobes increases the surface of the cells or compartments which these lobes define. With respect to the prior art, the surface of lift (section of the cells or compartments) is increased considerably, for virtually unchanged dimensions of the platform of the structure. On the other hand and this is particularly important, for vehicles intended for travelling at sea, the projecting part of the lobes constitutes a pneumatic protective belt all around the vehicle, which is effective against impact and in particular against the impact of waves.

Further features and advantages of the invention will become apparent on reading the ensuring description referring to the accompanying drawings in which.

Figure 1:
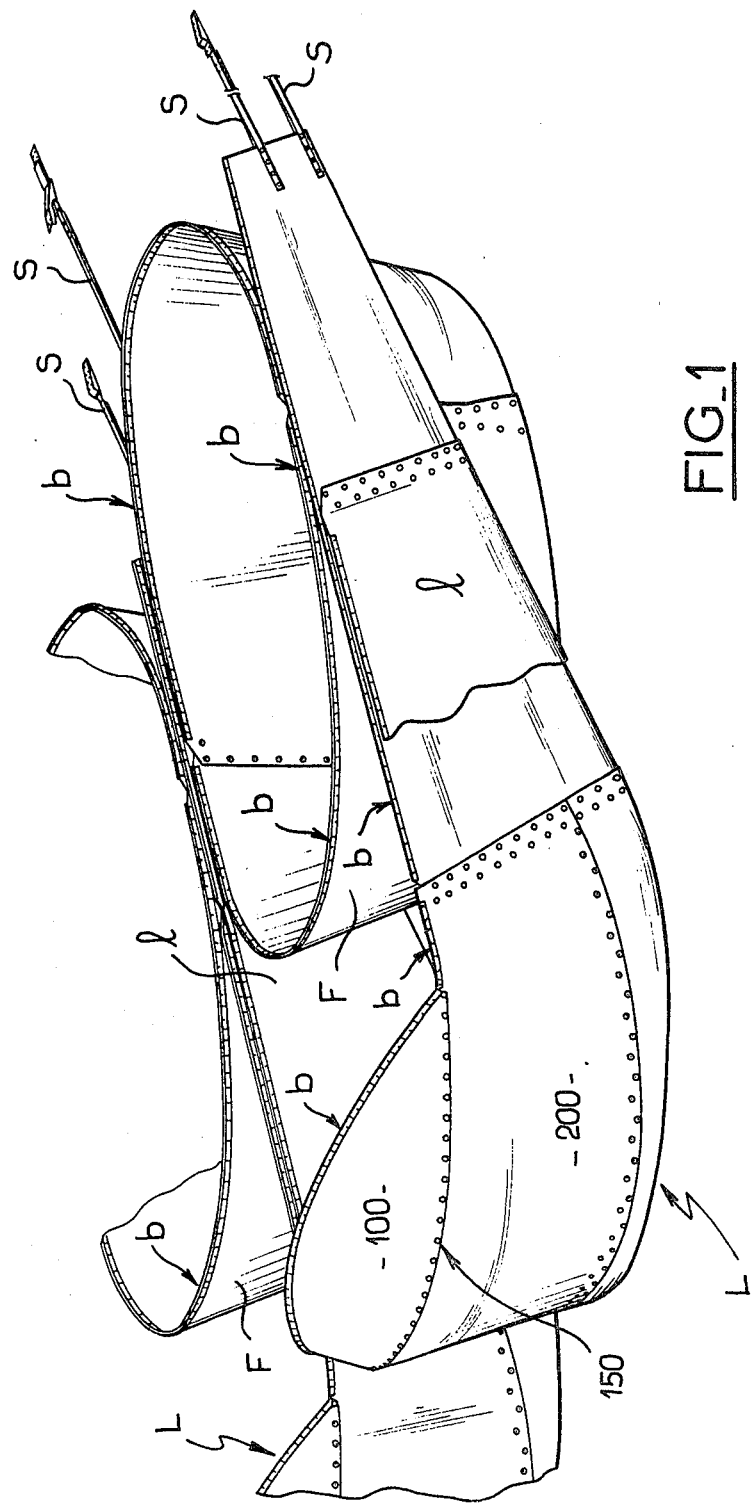
FIG. 1 is a perspective view of a new outer skirt lobe according to the invention, which represents an improvement of the outer skirt lobe illustrated in FIG. 4 of Pat. No. 75 04960.

In the example chosen to illustrate the invention, the vehicle travelling on an air cushion is assumed to be of the type described in Pat. No. 75 04960, to which reference should be made. FIG. 1 of the accompanying drawings is similar to FIG. 4 of said patent. It shows a cell of the peripheral arrangement of a vehicle travelling on an air cushion of the type described. A cell C of this type comprises an outer skirt constituted by a plurality of lobes such as L. Each lobe encloses a closed cylindrical or frustoconical skirt F laterally, whilst being tangential bilaterally to F along a sufficient area to ensure the seal. As shown, each lobe L has a curved shape, the sides 1 of the lobe being held under tension by the straps S, or other members.

The upper edge b of the skirts is naturally connected in a sealed manner to the structure of the platform.

According to the essential feature of the invention, each lobe such as L is no longer simply conical or simply cylindrical as previously. According to the invention, it is constituted by the assembly of an upper part 100 and a lower part 200, connected along a flat curve of connection 150. Each of the two parts 100, 200 is cylindrical or frustoconical, the two parts beng similar (cylinders of the same radius or truncated cones of the same conicity). As is shown clearly in FIG. 1, the part 100 diverges in a downwards direction from the centre of the lobe, whereas the part 200 converges towards the latter; the entire lobe thus has a projecting shape, the curve 150 constituting the area of greatest width.

Figure 2:
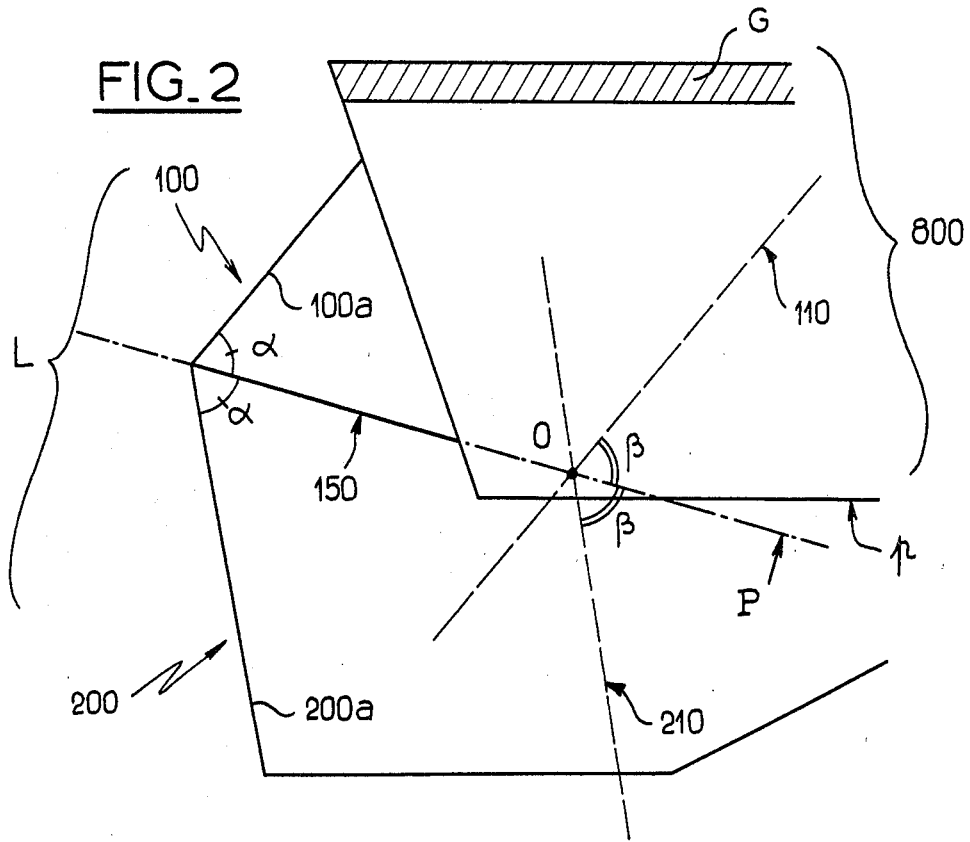
FIG. 2 is a diagram illustrating the geometric definition of the new skirt according to the invention.

FIG. 2 illustrates diagrammatically the geometric definition of the two parts 100 and 200 of the lobe L suspended from a platform structure G. The parts 100 and 200 are two surfaces of revolution about respective axes 110, 210; these two surfaces are similar (same radius in the case of a cylinder, or same angle of opening in the case of a cone). The axes of revolution 110 and 210 are located in the same vertical plane (plane of FIG. 2) where they intersect at a point O. The two surfaces 100 and 200 are connected along a curve 150 situated in a plane P at right angles to the plane of FIG. 2. As shown in this figure, the plane P is a plane bisecting the angle formed by the axes 110 and 210. Similarly, the plane P is a plane bisecting the angle formed by the two generatrices 100a and 200a (belonging respectively to the surface 100 and to the surface 200) situated in the plane of FIG. 2.

In such a context, one essential condition for stability of the complex skirt according to the invention is that the bisecting plane P thus defined does not pass outside the supporting structure 800. The structure 800 is limited in its upper part by the platform G and in its lower part by the wall p which forms the floor of the structure. In the example illustrated in FIG. 2, it can be seen that the plane P intersects this structure. At the limit, the plane P could be horizontal and could simply be tangential to the bottom of the structure (level with the wall p).

Figure 3:
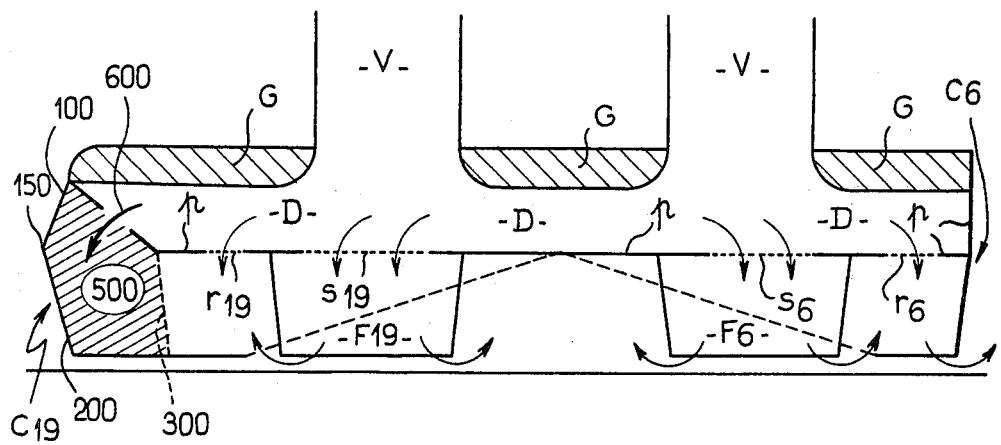
FIG. 3 is a general cross sectional view of a vehicle travelling on an air cushion equipped on one side with a new skirt according to the invention; this figure corresponds to FIG. 3 of the aforementioned Pat. No. 75 04960.

FIG. 3 of the accompanying drawings is fundamentally similar to that of FIG. 3 of the said Pat. No. 75 04960, to which reference should be made. In the left-hand part of the figure, in order to define the compartment $C_{19}$ externally, the lobe of the outer skirt initially provided has been replaced by a lobe in two parts 100, 200 according to the invention. The lobe of the prior art is shown in broken line by the reference numeral 300. It is easy to see that the inner volume of the compartment $C_{19}$ is increased by a volume 500 (which is indicated by shading in order to facilitate understanding), by virtue of the modification of the invention. This increase in volume 500 is clearly translated by a larger supporting surface of the air cushion, which obviously improves the performances of the machine.

On the other hand, as shown clearly in FIG. 3, the new structure comprising a projecting skirt now comprises all around the platform G a protective pneumatic bulge whereof the most eccentric area corresponds to the connections 150. As already stated, this is a substantial advantage, in particular for vehicles intended for travelling at sea, which are thus better able to withstand the impact of waves.

Finally, it will be noted that the new arrangement of lobes 100, 200 of the outer skirt (which are directly associated in the upper part with the platform G, then with the wall p which is connected obliquely to the platform), makes it possible to provide them, in all or in part, with an air supply opening out in the region of the upper part 100. A supply of this type bears the reference 600 in FIG. 3.

Naturally, the invention is not limited to the embodiment described with reference to Pat. No. 75 04960. But it extends to any construction of a vehicle travelling on an air cushion of the type comprising a central cushion and peripheral arrangement in which the peripheral arrangement is constituted by a multi-lobed skirt.

What is claimed is:

1. An air cushion vehicle comprising:
   a structure to be lifted,
   a central lifting cushion means, and
   a peripheral lifting arrangement including a multi-lobed skirt,
   each lobe of the skirt comprising an upper part, defined by a surface of revolution which is slanted downwardly and outwardly with respect to the structure, and a lower part, defined by a surface of revolution which is slanted downwardly and inwardly with respect to the structure, the lobe projecting outwardly of the periphery of the structure, and
   the axes of revolution of the upper and lower parts of each lobe being in substantially the same plane, and the upper and lower parts being connected along a plane of connection which substantially bisects the angle between the two axes of revolution.

2. A vehicle according to claim 1, in which the two parts are identical cylindrical or frustoconical surfaces of revolution.

3. A vehicle according to claim 1, in which said plane of connection intersects the structure and is at least tangential to the floor of the structure.

4. A vehicle according to claim 1, in which the air is supplied to each lobe at least partially at the level of the upper part of each lobe.

* * * * *